United States Patent [19]

Kover, Jr.

[11] Patent Number: 5,517,065

[45] Date of Patent: May 14, 1996

[54] AUTOMOTIVE DIGITAL LIGHT CONTROL CIRCUIT WITH LIGHT BUS MONITOR AND WINDSHIELD WIPER LIGHT CONTROL CIRCUIT

[76] Inventor: Joseph Kover, Jr., 463 W. Creekside La., Kaysville, Utah 84037

[21] Appl. No.: 192,862

[22] Filed: Feb. 7, 1994

Related U.S. Application Data

[63] Continuation-in-part of Ser. No. 920,854, Aug. 31, 1992, abandoned.

[51] Int. Cl.$^6$ .............................. B60Q 1/04; B60L 1/14
[52] U.S. Cl. .............................................. 307/10.8; 315/83
[58] Field of Search .................................. 307/10.1, 10.8, 307/10.6; 315/77, 82, 83; 362/802, 253, 61; 318/DIG. 2

[56] References Cited

U.S. PATENT DOCUMENTS

| | | | |
|---|---|---|---|
| 3,476,975 | 11/1969 | Brock | 315/82 |
| 3,514,665 | 5/1970 | Chaustowich | 315/82 |
| 3,544,838 | 12/1970 | Carruth et al. | 315/82 |
| 3,546,527 | 12/1970 | Chunn et al. | 315/82 |
| 3,591,845 | 7/1971 | Vanderpoel, Jr. et al. | 307/10.8 |
| 3,684,916 | 8/1972 | Skinner | 315/82 |
| 3,767,966 | 10/1973 | Bell | 315/83 |
| 3,798,500 | 3/1974 | Florence et al. | 315/82 |
| 3,818,267 | 6/1974 | Valenzona et al. | 315/82 |
| 3,821,593 | 6/1974 | Roselli | 315/82 |
| 3,824,405 | 7/1974 | Glaze | 307/10.8 |
| 4,097,839 | 6/1978 | Lesiak | 315/82 |
| 4,337,400 | 6/1982 | Hahn | 315/82 |
| 4,342,946 | 8/1982 | Hill et al. | 315/82 |
| 4,656,363 | 4/1987 | Carter et al. | 307/10.1 |
| 4,667,129 | 5/1987 | Papillon | 315/82 |
| 4,956,562 | 9/1990 | Benedict et al. | 307/10.8 |
| 4,965,461 | 10/1990 | McRoberts, Jr. et al. | 307/10.8 |
| 4,985,660 | 1/1991 | Cronk | 315/82 |
| 5,202,581 | 4/1993 | Moore | 307/10.8 |

*Primary Examiner*—William M. Shoop, Jr.
*Assistant Examiner*—Richard T. Elms
*Attorney, Agent, or Firm*—Mallinckrodt & Mallinckrodt

[57] ABSTRACT

An apparatus for automatically turning out the headlights, and preferably also the tail/park lights, of a vehicle when the ignition switch is turned off, includes an auxiliary switch connected in electrical series between a vehicle light control switch and the vehicle headlights and tail/park lights so that both the light control switch and auxiliary switch must be closed to operate the headlights and tail/park light, and a bypass switch connected in electrical parallel with the auxiliary switch so that the bypass switch can be operated to bypass the auxiliary switch if the auxiliary switch is not working properly. The bypass switch is preferably also in electrical parallel with the vehicle light control switch so that the bypass switch can be used to bypass both the vehicle light control switch and auxiliary switch to operate the headlights and tail/park lights, for example, when the windshield wiper switch is on. Control circuitry linked to the vehicle ignition switch is provided to close the auxiliary switch when the ignition switch is on and the light control switch is closed to operate the headlights and tail/park lights but to open the auxiliary switch when the ignition switch is off. Bypass circuitry linked to the ignition switch is provided to monitor operation of the auxiliary switch and operate the bypass switch if the auxiliary switch does not function properly and/or also linked to the windshield wiper switch to close the bypass switch to operate the headlights and tail/park lights when the windshield wiper switch is closed. Both the control circuitry and the bypass circuitry turn off the headlights and tail/park lights when the ignition switch is turned off.

17 Claims, 2 Drawing Sheets ns. 5,517,065

AUTOMOTIVE DIGITAL LIGHT CONTROL CIRCUIT WITH LIGHT BUS MONITOR AND WINDSHIELD WIPER LIGHT CONTROL CIRCUIT

RELATED APPLICATIONS

This is a continuation-in-part of my application Ser. No. 920,854, filed Aug. 31, 1992, and entitled "Digital Automobile Light Control Unit (LCU) With Automatic Light Turn Off, Secondary Light Control Circuit, And Head Tail/Park Light Detector", now abandoned.

BACKGROUND OF THE INVENTION

1. Field of the Invention

The invention relates to circuits which automatically turn off the head and tail/park lights of an automobile or other vehicle when turning off the ignition switch. This prevents the inadvertent discharge of the battery should the operator fail to separately turn off the head and tail/park lights when turning off the ignition switch. The invention also relates to circuits which automatically turn on the head and tail/park lights in conjunction with turning on the vehicle windshield wiper switch.

2. State of the Art

If vehicle headlights are on during daylight hours, it is common to forget to turn the lights off when the vehicle ignition is turned off. Some vehicles have buzzers or other audio alarms to warn a driver leaving a vehicle that the lights are still on, but in some cases drivers may not hear or pay attention to such audio alarms. A usual result of leaving lights on when the vehicle is parked and the ignition is turned off is that the lights drain the vehicle battery so it cannot be started later.

A number of circuits and devices are currently available which automatically turn off the head and tail/park lights when turning off the ignition switch. However, none of these circuits and devices include a circuit which monitors the operation of the circuit or device and include a bypass circuit which automatically engages, if the primary light control circuit should fail, thereby restoring the head and tail/park lights.

There are also a number of circuits and devices which automatically turn on the head and tail/park lights in combination with the windshield wiper switch. Several states now have laws requiring that the vehicle lights be turned on in combination with the windshield wipers. This is presumably a safety feature so lights are turned on during stormy weather. However, none of these circuits and devices include a provision to automatically turn off the head and tail/park lights when turning off the ignition switch regardless of whether the light switch is in the on or the off position.

SUMMARY OF THE INVENTION

The invention provides an apparatus which automatically turns off the head and tail/park lights when turning off the ignition switch. This serves to prevent the inadvertent discharge of the battery should the operator fail to turn off the head and tail/park lights when turning off the ignition switch. The apparatus may also automatically turn on the head and tail/park lights in conjunction with the windshield wipers. The light control apparatus includes a control circuit controlling an auxiliary switch and a bypass circuit controlling a bypass switch. If the control circuit or auxiliary switch should fail, the light bus monitor automatically engages the bypass switch which restores the head and tail/park lights.

If the head and tail/park lights are turned on in conjunction with the windshield wiper switch, the lights will remain on until the ignition switch is placed in the off position. This feature precludes the operator from inadvertently turning off the lights during hours of darkness when placing the windshield wiper switch in the off position. If the bypass circuit should fail during the operation of the windshield wipers, the operator simply places the head and tail/park light switch in the on position which restores the head and tail/park lights.

The light control circuit includes an auxiliary switch means, such as a relay, to be connected in series between the vehicle's normal light control switch and the lights being controlled by such switch. Thus, to operate the lights, both the normal light control switch and the auxiliary switch must be closed. Control circuitry is included to be coupled to the vehicle ignition switch to allow closing of the auxiliary switch means and operation of the lights when the ignition switch is on, but to open the auxiliary switch means and prevent operation of the vehicle lights when the ignition switch is off. A bypass switch means, such as a relay, is also provided and is connected in parallel with the auxiliary switch, and generally is adapted to be connected also in parallel with the vehicle light control switch. Bypass control circuitry is also provided to be coupled to the vehicle ignition switch for monitoring the operation of the auxiliary switch means (this portion of the circuitry is sometimes referred to as the "light bus monitor") and for operating the bypass switch means to bypass the auxiliary switch if the bypass control circuitry detects that the auxiliary switch means is not functioning properly to thereby allow operation of the lights when desired when the ignition switch is on, but again, to open the bypass switch and prevent operation of the lights when the ignition switch is off. When the bypass switch means is connected in parallel with both the auxiliary switch and the vehicle light control switch, the bypass control circuitry may be coupled to the vehicle windshield wiper switch to close the bypass switch and cause operation of the vehicle lights when the windshield wiper switch is operated to activate the windshield wipers. In such event, it is preferred that the bypass control circuitry be arranged so that the bypass switch means, once closed by operation of the windshield wipers, remains closed even when the windshield wipers are turned off to avoid turning off the lights in darkness when the windshield wipers are turned off.

In most vehicles, the vehicle light control switch is a double pole switch with one pole connected to operate the vehicle tail/park lights and the other pole connected to operate the headlights. In such case, the auxiliary switch means will preferably also be double pole with one pole connected in the tail/park light circuit and the other connected in the headlight circuit. The bypass switch means similarly will also preferably be double pole.

The light control circuit of the invention is designed to be integrated into the automotive lighting system of new production automobiles and into the lighting system of existing automobiles.

BRIEF DESCRIPTION OF THE DRAWINGS

The best mode presently contemplated for carrying out the invention is illustrated in the accompanying drawings, in which.

DETAILED DESCRIPTION OF THE ILLUSTRATED EMBODIMENT

Figure 1:
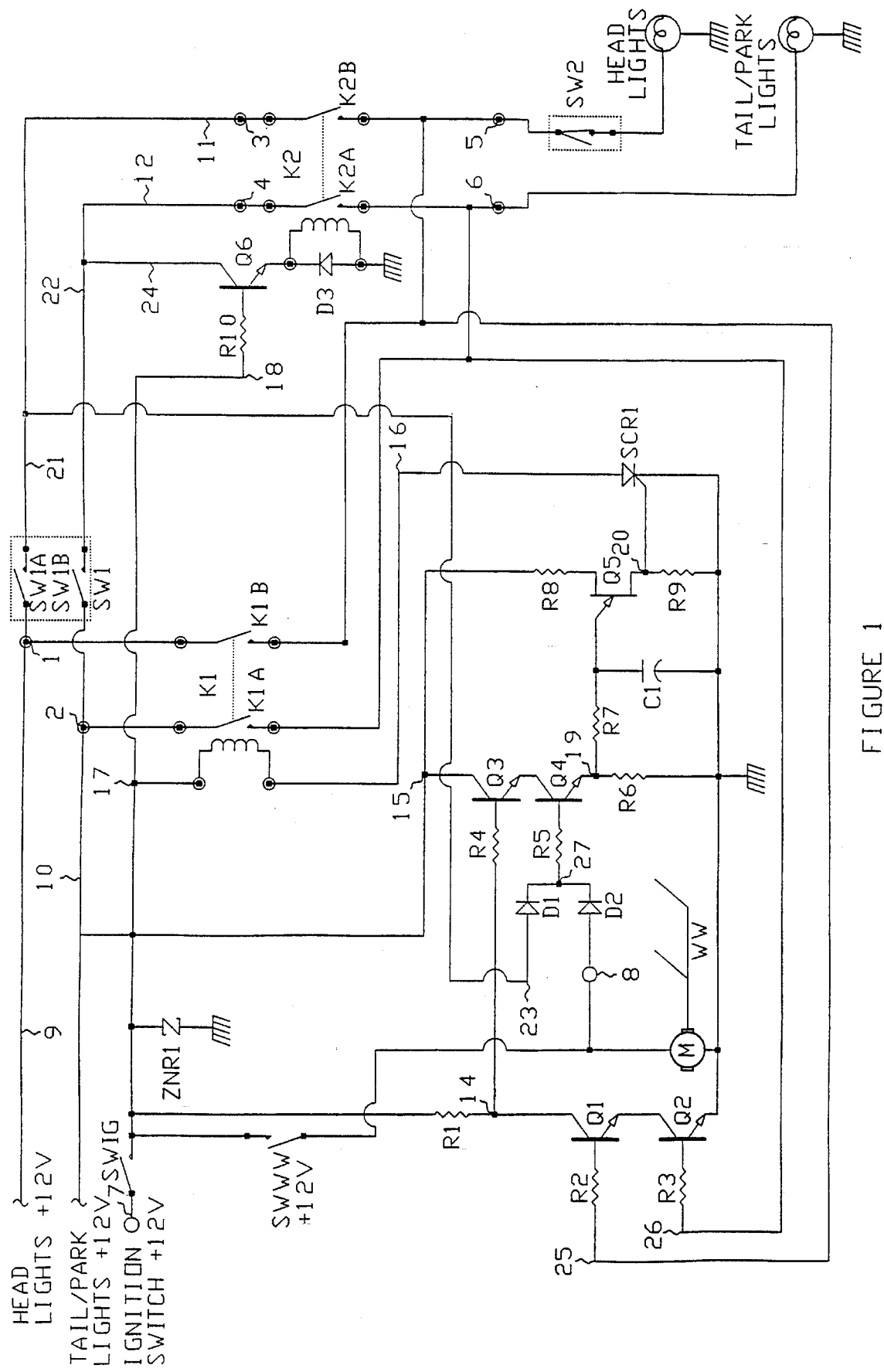
FIG. 1 is a circuit diagram of a light control apparatus of the invention, and including some portions of the automobile lighting system.
Figure 2:
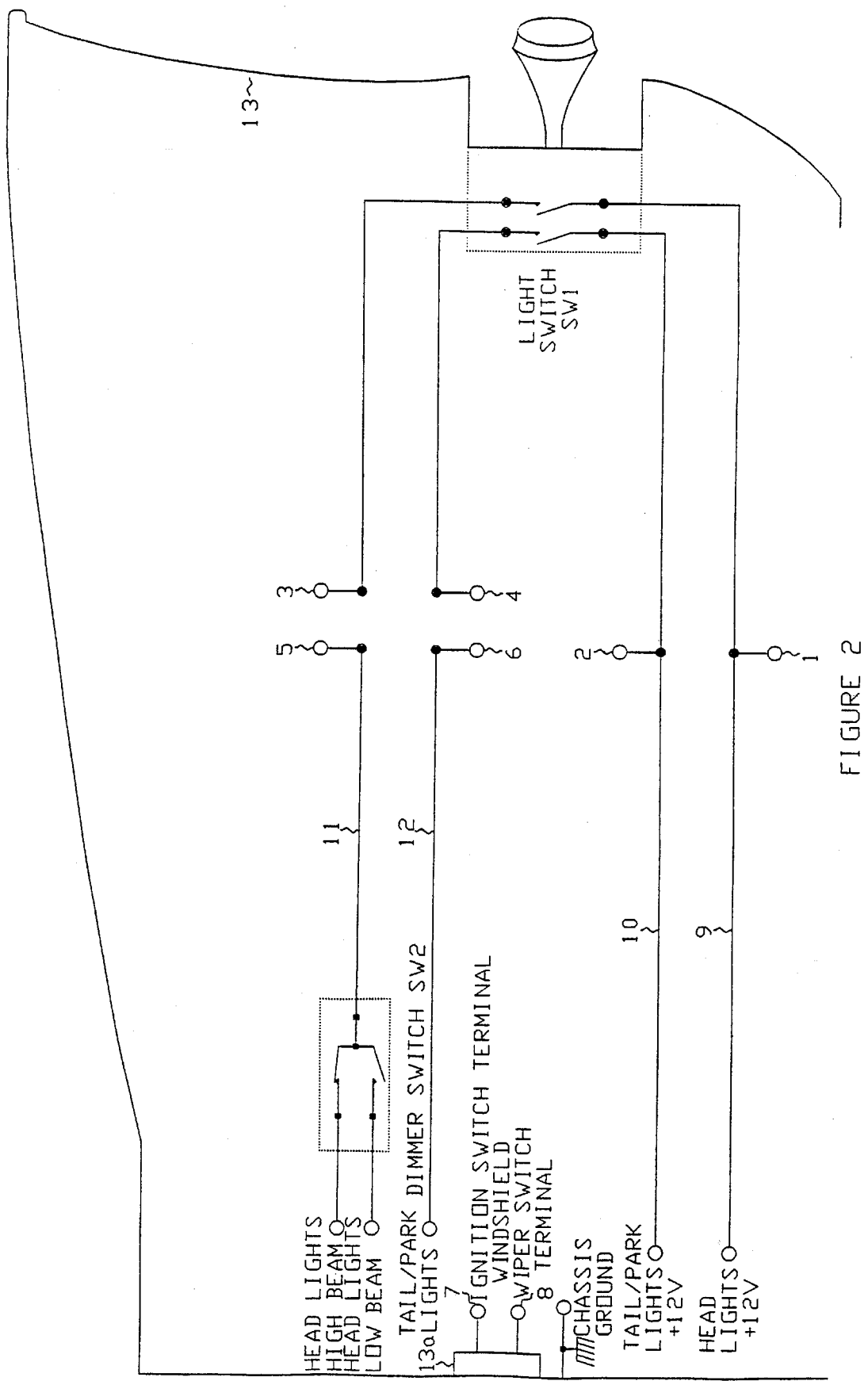
FIG. 2 a schematic representation showing the connection of the light control apparatus to an automotive electrical system.

The light control apparatus in FIG. 1 may be integrated into the automotive lighting system of new production automobiles or may be easily added to existing automobiles. As shown in FIG. 2, the circuitry is designed for use in automobiles having an ignition switch SWIG with switched terminal indicated schematically at 7, a head and tail/park light switch indicated as SW1, a headlight dimmer switch indicated as SW2, a windshield wiper switch with switched terminal indicated schematically at 8, and a 12 volt direct current negative ground electrical system. The illustrated embodiment of FIG. 1 may be directly integrated into the electrical system of an automobile by connecting connection points 1–9 in the circuitry shown in FIG. 1 to the similarly numbered connection points 1–9 in the standard automobile electrical system shown in FIG. 2. The designated connections between the automotive electrical system of FIG. 2 and the circuitry of FIG. 1 may be established by a nine conductor mate-n-lok connector. The lines 9, 10, 11, and 12 in FIGS. 1 and 2 represent the automotive head and tail/park light conductors from the positive twelve volt source to the usual head and tail/park light switch SW1, generally mounted on the vehicle dashboard indicated schematically as 13, and the head and tail/park light conductors leading from the switch SW1 to the headlight dimmer switch SW2 and the tail/park lights, respectively. The lines 11 and 12 from the switch SW1 are sometimes referred to herein as the light bus. The block 13a in FIG. 2 represents the ignition switch and windshield wiper switch SWWW terminal block from which the switched terminals 7 and 8 extend. When connected to the automotive electrical system as shown, the apparatus of the invention places a double pole, single throw relay K1 in parallel with the head and tail/park light switch SW1 and a second double pole, single throw relay K2. Relay K2 is connected with contacts K2B in series between head and tail/park light switch SW1 and the head light dimmer switch SW2, and with contacts K2A in series between head and tail/park light switch SW1 and the tail/park lights.

The initial voltage level at points 14, 15, 16, 17, and 18 with the ignition switch SWIG in the on position (12 volts is supplied by ignition switch terminal 7) and with both contacts SW1A and SW1B of the head and tail/park light switch SW1 open (lights turned off) and the windshield wiper switch SWWW in the off or open position (0 volts is present on terminal 8), is equal to 12 volts. Zero volts are present at points 8, 21, 22, 23, 24, 25, and 26 of FIG. 1. With 12 volts at points 14, 15, 16, 17, and 18 and 0 volts at points 8, 21, 22, 23, 24, 25, and 26, diodes D1 and D2 are in the off state, transistor Q3 is in the saturation state, transistors Q1 and Q2 are in the cutoff state, and transistor Q6, with zero volts on its collector, is also non-conducting and may be considered in cutoff state. With D1 and D2 in the off state, the voltage level at point 27 is equal to 0 volts which places Q4 in the cutoff state. The voltage level at point 19 with Q3 in the saturation state and Q4 in the cutoff state is equal to 0 volts which places Q5 is in the cutoff state. With Q5 in the cutoff state, the voltage level at point 20 is equal to 0 volts which places silicon control rectifier SCR1 in the off state. With SCR1 in the off state and Q6 in the cutoff state, both relays K1 and K2 are in the off state with the contacts K1A, K1B, K2A, and K2B in the open position. This means that neither the head nor the tail/park lights are energized.

The Surge Suppressor ZNR1 protects the light control circuit from electrical surges which may be introduced by the automobile electrical system.

When the ignition switch is off, 0 volts is supplied by ignition switch terminal 7 (this also means that 0 volts is supplied by windshield wiper switch terminal 8 since generally the ignition switch turns off power to the windshield wipers), so the voltage level at points 8, 14, 15, 16, 17, 18, 21, 22, 23, 24, 25 and 26 is equal to 0 volts. The 0 volts at these points places D1 and D2 in the off state and Q1, Q2, Q3, and Q6 in the cutoff state. With D1 and D2 in the off state, the voltage level at point 27 is equal to 0 volts. The 0 volts at point 27 places Q4 in the cutoff state. The voltage level at point 19, with both Q3 and Q4 in the cutoff state, is equal to 0 volts which places Q5 in the cutoff state. The voltage level at point 20, with Q5 in the cutoff state, is equal to 0 volts. The 0 volts at this point places SCR1 in the off state. With SCR1 in the off state and Q6 in the cutoff state, the coils of both relays K1 and K2 fail to energize and the contacts K1A, K1B, K2A, and K2B are in the open state. This again means that neither the head nor the tail/park lights are energized.

The initial voltage level at points 14, 15, 16, 17, 18, 21, 22, 23, and 24 with the ignition switch SWIG on to produce 12 volts on terminal 7, with both contacts SW1A and SW1B of the head and tail/park light switch SW1 in the on position (lights are turned on), and with the windshield wiper switch SWWW in the off position, is equal to 12 volts. Zero volts are present at points 8, 25, and 26 of FIG. 1. With 12 volts at points 14, 15, 16, 17, 18, 21, 22, 23, and 24 and 0 volts at points 8, 25, and 26, diode D1 is in the on state and transistors Q3 and Q6 are in the saturation state. With D1 in the on state, the voltage level at point 27 is equal to 12 volts which places Q4 in the saturation state. With Q6 in the saturation state, the primary light control circuit, which is comprised of light switch SW1, R10, D3 (which serves to absorb the inductive shock of relay K2), and Q6 (in the on state) cause the coil of relay K2 to be energized. With the coil of relay K2 energized, contacts K2A and K2B shift from the open to the closed state. With the closing of relay contacts K2A and K2B, the voltage level at points 25 and 26 of FIG. 1 shift from 0 to 12 volts placing Q1 and Q2 in the saturation state. With Q1 and Q2 in the saturation state, the voltage level at point 14 shifts from 12 volts to 0 volts. The 0 volts at point 14 places Q3 in the cutoff state. The voltage level at point 19 with Q3 in the cutoff state and Q4 in the saturation state is equal to 0 volts which places Q5 in the cutoff state. With Q5 in the cutoff state, the voltage level at point 20 is equal to 0 volts. With 0 volts at point 20, SCR1 is in the off state. With SCR1 in the off state, the coil of relay K1 fails to energize and the contacts K1A and K1B remain in the open state. It should be noted that although initially when contact SW1A of light switch SW1 is closed, 12 volts is supplied to point 23 to turn on Q4 and provide 12 volts at point 19, resistor R7 and capacitor C1 form a timing circuit whereby the build-up of voltage across C1 occurs relatively slowly. This means that when transistors Q1 and Q2 turn on and ground point 14 to turn off transistor Q3, which occurs very rapidly when the light switch SW1 is turned on, the voltage across C1 has not yet built up to a level to turn on Q5. Thus, Q5 is not turned on.

While the primary light control circuit has been described as comprising of SW1, R10, D3, Q6, and K2, switch SW1 comprises the vehicle light control switch and relay K2 comprises the auxiliary switch connected in series with the light control switch. The remaining components mentioned as comprising the primary light control circuit are part of the control circuitry for the apparatus.

With the primary light control circuit in the condition described to operate the head and tail/park lights, if the primary light control circuit should fail, for example if relay K2 or transistor Q6 should fail so relay contacts K2A and/or K2B should open, the light bus monitor feature of the bypass circuitry the invention automatically activates the bypass switch means K1 so that the lights remain on. Without this feature, if the primary light control circuit failed, the lights would go out and remain out until the circuitry was repaired.

The light bus monitor, which operates to ensure that both the head and tail/park lights are energized when the light switch is operated so that both contacts SW1A and SW1B are closed, and which is comprised of resistors R1–R3 and transistors Q1–Q2, is designed to monitor the operation of the light control circuit bus, i.e., lines 11 and 12. If the primary light control circuit should fail, the secondary light control circuit, which is comprised of resistors R4–R9, capacitor C1, diode D1, transistors Q3–Q5, SCR1, and relay K1, automatically activates. The light bus monitor and secondary light control circuit are both included in what is referred to sometimes herein as the bypass circuitry. Relay K1 constitutes bypass switch means. The light bus monitor is based upon the theory that the light bus will be in one of four possible operational states. These operational states are as follows: 1) the head and tail/park light bus (lines 11 and 12, respectfully) are both in a high state with 12 volts. This indicates proper operation of the primary light control circuit as both the head and tail/park lights are energized. 2) The head light bus is in a low state with 0 volts and the tail/park light bus is in a high state with 12 volts. This indicates failure of the primary control circuit as the head lights should be energized, but are not. 3) The head light bus is in a high state with 12 volts and the tail/park light bus is in a low state with 0 volts. This indicates failure of the primary control circuit as the tail/park lights should be energized, but are not. 4) The head and tail/park light bus both are in a low state with 0 volts. This indicates failure of the primary control circuit as both the head and tail/park lights should be energized, but are not. While the light bus monitor will detect failure in the primary control circuit, it does not detect failure of the light switch SW1. It assumes that switch SW1 is operating properly and is in position with both contacts SW1A and SW1B closed. With the feature of the circuitry which turns the lights on when the windshield wipers WW are on, if the light switch SW1 fails, the lights can be operated by turning on the windshield wipers WW.

In operational state 1, the voltage level at both points 25 and 26 of the light bus monitor is equal to 12 volts. With 12 volts at points 25 and 26, both Q1 and Q2 are in the saturation state. The voltage level at point 14 is equal to 0 volts with both Q1 and Q2 in the saturation state. The 0 volts at point 14 places Q3 in the cutoff state while the 12 volts from SW1A at point 23 places D1 in the on state. With D1 in the on state, the voltage level at point 27 is equal to 12 volts. The 12 volts at point 27 places Q4 in the saturation state. The voltage level at point 19 with Q3 in the cutoff state and Q4 in the saturation state is equal to 0 volts. With 0 volts at point 19, Q5 is in the cutoff state and SCR1 is in the off state. With SCR1 in the off state, the coil of relay K1 fails to energize and the contacts K1A and K1B are in the open state.

In operational state 2, the voltage level at point 25 is equal to 12 volts and at point 26 is equal to 0 volts. With 12 volts at point 25 and 0 volts at point 26, Q1 is in the saturation state while Q2 is in the cutoff state. The voltage level at point 14 with Q1 in the saturation state and Q2 in the cutoff state is equal to 12 volts. The 12 volts at point 14 places Q3 in the saturation state while the 12 volts from SW1A at point 23 places D1 in the on state. With D1 in the on state, the voltage level at point 27 is equal to 12 volts. The 12 volts at point 27 places Q4 in the saturation state. With both Q3 and Q4 in the saturation state, the voltage level at point 19 is equal to 12 volts. With 12 volts at point 19, Q5 is in the saturation state and SCR1 shifts to the on state. With SCR1 in the on state, the coil of relay K1 becomes energized and the contacts K1A and K1B shift from the open to the closed state, therefore restoring operation of the head lights.

In operational state 3, the voltage level at point 25 is equal to 0 volts and at point 26 is equal to 12 volts. With 0 volts at point 25 and 12 volts at point 26, Q1 is in the cutoff state while Q2 is in the saturation state. The voltage level at point 14 with Q1 in the cutoff state and Q2 in the saturation state is equal to 12 volts. The 12 volts at point 14 places Q3 in the saturation state while the 12 volts from SW1A at point 23 places D1 in the on state. With D1 in the on state, the voltage level at point 27 is equal to 12 volts. The 12 volts at point 27 places Q4 in the saturation state. With both Q3 and Q4 in the saturation state, the voltage level at point 19 is equal to 12 volts. With 12 volts at point 19, Q5 is in the saturation state and SCR1 shifts to the on state. With SCR1 in the on state, the coil of relay K1 becomes energized and the contacts K1A and K1B shift from the open to the closed state, therefore restoring operation of the tail/park lights.

In operational state 4, the voltage level at both points 25 and 26 of the light bus monitor is equal to 0 volts. With 0 volts at points 25 and 26, both Q1 and Q2 are in the cutoff state. The voltage level at point 14 is equal to 12 volts with both Q1 and Q2 in the cutoff state. The 12 volts at point 14 places Q3 in the saturation state while the 12 volts from SW1A at point 23 places D1 in the on state. With D1 in the on state, the voltage level at point 27 is equal to 12 volts. The 12 volts at point 27 places Q4 in the saturation state. The voltage level at point 19 with both Q3 and Q4 in the saturation state is equal to 12 volts. With 12 volts at point 19, Q5 is in the saturation state and SCR1 shifts to the on state. With SCR1 in the on state, the coil of relay K1 becomes energized and the contacts K1A and K1B shift from the open to the closed state, therefore restoring the head and tail/park lights.

As with the primary light control circuit, the secondary light control circuit will also automatically turn off when the ignition switch SWIG is placed in the off position, thereby turning off the head and tail/park lights when the ignition switch SWIG is turned off. The 12 volts from the ignition switch SWIG through terminal 7 energizes the coil of relay K1. When the ignition switch SWIG is placed in the off position, the coil of relay K1 is no longer energized. With the coil of relay K1 no longer energized, the current level falls below the SCR1 minimum holding current. With the current level below the SCR1 minimum holding current, both SCR1 and relay K1 shift from the on to the off state. With relay K1 in the off state the contacts K1A and K1B shift from the closed to the open state. The resistor-capacitor network of R7 and C1 delays the activation of the secondary light control circuit slightly as previously explained to keep the secondary circuit from operating upon initial closing of the light switch SW1.

If the ignition switch SWIG is on and the tail/park lights are turned on but the headlights are not turned on, i.e., the ignition switch SWIG and contact SW1B of the head and tail/park light switch SW1 are in the on position, and contact SW1A of the head and tail/park light switch SW1 and the windshield wiper switch SWWW are in the off position, the initial voltage at points 14, 15, 16, 17, 18, 22, 24, and 26 is equal to 12 volts. Zero volts are present at points 8, 21, 23, and 25 of FIG. 1. With 12 volts at points 14, 15, 16, 17, 18, 22, 24, and 26 and 0 volts at points 8, 21, 23, and 25, D1 and D2 are in the off state, Q3 and Q6 are in the saturation state, and Q 1 and Q4 are in the cutoff state. With D1 and D2 in the off state, the voltage level at point 27 is equal to 0 volts which places Q4 in the cutoff state. With Q6 in the saturation state, the primary light control circuit shifts from the off to the on state and the coil of relay K2 becomes energized. With the coil of relay K2 energized, the contacts K2A and K2B shift from the open to the closed state. The voltage level at point 19 with Q3 in the saturation state and Q4 in the cutoff state is equal to 0 volts which places Q5 in the cutoff state. With Q5 in the cutoff state the voltage level at point 20 is equal to 0 volts which keeps SCR1 in the off state. With SCR1 in the off state and Q6 in the saturation state, the contacts K1A and K1B of relay K1 are in the open state while the contacts K2A and K2B of relay K2 are in the closed state. This feature allows the operator to turn off the headlights, while the tail/park lights remain on, without activating the secondary circuit.

When the ignition switch SWIG is turned off while the parking lights are on, i.e., while contact SW1B of the head and tail/park light switch SW1 is in the on or closed position and contact SW1A of the head and tail/park light switch SW1 and the windshield wiper switch SWWW are both in the off or open position, the voltage level at points 8, 14, 15, 16, 17, 18, 21, 23, and 25 of FIG. 1 is equal to 0 volts. With 0 volts at these points, D1 and D2 are in the off state, and Q1, Q3, Q4, and Q6 are in the cutoff state. With Q6 in the cutoff state, the coil of relay K2 is no longer energized, and the contacts K2,A and K2B move to the open position. The voltage level at point 26 shifts from 12 volts to 0 volts which places Q2 in the cutoff state. The voltage level at point 19, with both Q3 and Q4 in the cutoff state is equal to 0 volts which places Q5 in the cutoff state. With Q5 in the cutoff state the voltage level at point 20 is equal to 0 volts. The 0 volts at point 20 maintains SCR1 in the off state. With SCR1 in the off state and Q6 in the cutoff state, the coil of relay K1 remains unenergized and the coil of relay K2 is no longer energized. The tail/park light will go off.

If the windshield wiper switch SWWW is turned on while the ignition switch is on and the lights are off, i.e., both contacts SW1A and SW1B of the head and tail/park light switch SW1 are in the open position, the initial voltage level at points 8, 14, 15, 16, 17, and 18 is equal to 12 volts. Zero volts is present at points 21, 22, 23, 24, 25, and 26 of FIG. 1. With 12 volts at points 8, 14, 15, 16, 17, and 18 and 0 volts at points 21, 22, 23, 24, 25, and 26, D2 is in the on state, D1 is in the off state, Q3 is in the saturation state, and Q1, Q2, and Q6 are in the cutoff state. The voltage level at point 27 with D2 in the on state and D1 in the off state is equal to 12 volts which places Q4 in the saturation state. The voltage level at point 19 with both Q3 and Q4 in the saturation state is equal to 12 volts which places Q5 in the saturation state. With Q5 in the saturation state, the voltage level at point 20 is equal to 12 volts which places SCR1 in the on state. With SCR1 in the on state, the coil of relay K1 becomes energized and the contacts K1A and K1B shift from the open to the closed state.

Once the head and tail/park lights have been turned on by turning on the windshield wiper switch, SWWW since SCR1, once triggered on, will remain on until the current through the coil of relay K1 and SCR1 drops below the SCR holding voltage, the head and tail/park lights will remain on until the ignition switch is placed in the off position, even when the windshield wiper switch SWWW is turned off. This feature precludes the operator from inadvertently turning off the lights during the hours of darkness when placing the windshield wiper switch in the off position.

If the secondary light control circuit should fail during the operation of the windshield wipers, the operator simply places the head and tail/park light switch SW1 in the on position, closing the contacts SW1A and SW1B. With the contacts SW1A and SW1B in the dosed position, the voltage level at points 21, 22, 23, and 24 of FIG. 1 shifts from 0 volts to 12 volts. The 12 volts at points 8, 14, 15, 16, 17, 18, 21, 22, 23, and 24 places both D1 and D2 in the on state and Q3, Q4, and Q6 in the saturation state. With Q6 in the saturation state, the primary light control circuit shifts from the off to the on state which energizes the coil of relay K2. With the coil of relay K2 energized, the contacts K2A and K2B shift from the open to the closed state to restore the head and tail/park lights. With relay K2 energized, the voltage level at points 25 and 26 of FIG. 1 shifts from 0 volts to 12 volts which places Q1 and Q2 in the saturation state. With Q1 and Q2 in the saturation state, the voltage level at point 14 is equal to 0 volts which places Q3 in the cutoff state. The 12 volts at points 8, 15, 16, 17, 18, 21, 22, 23, 24, 25, and 26, places D1 and D2 in the on state, Q1, Q2, and Q6 in the saturation state, and Q3 in the cutoff state. With D1 and D2 in the on state, the voltage level at point 27 is equal to 12 volts which places Q4 in the saturation state. The voltage level at point 19 with Q3 in the cutoff state and Q4 in the saturation state is equal to 0 volts which places Q5 in the cutoff state; however, Q6 remains in the saturation state so that the coil of relay K2 remains energized with contacts K2A and K2B closed to keep the head and tail/park lights on.

If the lights have been turned on by the windshield wiper switch being turned on, and the ignition switch is turned off without turning off the windshield wiper switch, the lights will go off. First, as pointed out above, most windshield wiper switches are coupled to the ignition switch so when the ignition switch is turned off, 0 volts appear on output 8 of the windshield wiper switch even though that switch has not been turned off. Thus, when the ignition switch is placed in the off position, even though the windshield wiper switch remains in the on position, and both contacts SW1A and SW1B of the head and tail/park light switch SW1 are in the off position, the voltage level at points 8, 14, 15, 16, 17, 18, 21, 22, 23, 24, 25, and 26 is equal to 0 volts. With 0 volts at these points, D1 and D2 are placed in the off state and Q1, Q2, Q3, Q4, and Q6 are placed in the cutoff state. The voltage level at point 19 with Q3 and Q4 in the cutoff state, is equal to 0 volts which places Q5 is in the cutoff state. With the ignition switch in the off position the coil of relay K1 is no longer energized. With the coil of relay K1 no longer energized the current level falls below the SCR1 holding current which places both SCR1 and relay K1 in the off state and the contacts K1A and K1B shift from the on to the off or open state.

If the windshield wipers are turned on while the ignition and head and/or tail/park lights are on, the voltage level at points 8, 15, 16, 17, 18, 21, 22, 23, and 24 when the wipers are turned on is equal to 12 volts. The 12 volts at these points places both D1 and D2 in the on state and Q6 in the saturation state. With D1 in the on state, the voltage level at point 27 is equal to 12 volts which places Q4 in the saturation state. With Q6 in the saturation state the primary light control circuit is in the on state energizing the coil of relay K2. With the coil of relay K2 energized and contacts K2A and K2B in the closed state, the voltage level at points 25 and 26 is also at 12 volts placing both Q1 and Q2 in the saturation state. With Q1 and Q2 in the saturation state the voltage level at point 14 is equal to 0 volts. With 12 volts at points 8, 15, 16, 17, 18, 21, 22, 23, 24, 25, 26, and 27 and 0 volts at point 14, Q1, Q2, Q4, and Q6 are in the saturation state and Q3 is in the cutoff state. The voltage level at point 19 with Q3 in the cutoff state and Q4 in the saturation state is equal to 0 volts which holds Q5 in the cutoff state. With Q5 in the cutoff state the voltage level at point 20 is equal to 0 volts which maintains SCR1 in the off state. With SCR1 in the off state, the coil of relay K2 fails to energize and the contacts K1A and K1B remain in the open state. Thus, if the lights are already on when the windshield wiper switch is turned on, the state of the circuits does not change and relay K1 is not energized.

In this situation, when the ignition switch is turned off, both contacts SW1A and SW1B of the head and tail/park light switch SW1 and the windshield wiper switch are in the on position, the voltage level at points 8, 14, 15, 16, 17, and 18 is equal to 0 volts while the voltage level at points 21, 22, 23, 24, and 27 is equal to 12 volts. With 0 volts at points 8, 14, 15, 16, 17, and 18, both Q3 and Q6 are placed in the cutoff state. With Q6 in the cutoff state, the coil of relay K2 is no longer energized and the contacts K2A and K2B shift from the closed to the open state. The voltage level at points 25 and 26 of FIG. 1 shifts to 0 volts which places Q 1 and Q2 in the cutoff state. The voltage level at point 19, with Q3 in the cutoff state, is equal to 0 volts which places Q5 in the cutoff state. With Q5 in the cutoff state, the voltage level at point 20 is equal to 0 volts which places SCR1 in the off state. With SCR1 in the off state, the coil of relay K1 fails to energize and the contacts K1A and K1B are in the open state.

While the relay K1, which serves as a bypass switch means to bypass relay K2 in the event of a failure of relay K2 or its control circuitry, is shown connected in electrical parallel with both the light switch SW1 and relay K2, and such connection is necessary for the feature of the circuitry which turns on the lights when the windshield wipers are turned on, if the windshield wiper feature is not included, the relay K1 may, if desired, be connected in parallel with only relay K2. This maintains the fail-safe feature which operates the bypass relay K1 if the auxiliary relay K2 or its control circuitry should fail.

While the circuitry shown and described operates both the vehicle headlights and the vehicle tail/park lights, and it is currently preferred to control all such lights, the apparatus could be set up to merely control the headlights since the headlights cause the major drain on the vehicle battery.

Whereas this invention is here illustrated and described with reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. Apparatus for turning out the headlights of a vehicle when an ignition switch of the vehicle is turned off, said vehicle having a light control switch electrically connected to the headlights to control operation of the headlights, comprising:

auxiliary switch means adapted for control by the ignition switch for electrical connection in series with a vehicle light control switch and vehicle headlights so that both the light control switch and auxiliary switch means must be closed to operate the headlights;

bypass switch means for electrical connection in parallel with the series connected combination of the light control switch and said auxiliary switch means;

control circuitry to be coupled to the ignition switch to allow closing of the auxiliary switch means and operation of the headlights when the ignition switch is on, but to open the auxiliary switch means and prevent operation of the headlights when the ignition switch is off; and bypass circuitry to be coupled to said ignition switch for monitoring operation of the auxiliary switch means and operating the bypass switch means to cause closure of the bypass switch means and operation of the headlights when the ignition switch is on and the light control switch is closed to operate the headlights but the auxiliary switch means is not properly operating, and to open the bypass switch means and prevent operation of the headlights when the ignition switch is off.

2. Apparatus for turning out the headlights of a vehicle when the ignition switch of the vehicle is turned off, according to claim 1, wherein the light control switch is also electrically connected to and controls operation of the vehicle tail/park lights in addition to the vehicle headlights, and both the auxiliary switch means and the bypass switch means are also electrically connected to the tail/park lights similarly to the headlights to allow operation of the tail/park lights when the ignition switch is on but to turn out the tail/park lights when the ignition switch of the vehicle is turned off.

3. Apparatus for turning out the headlights of a vehicle when the ignition switch of the vehicle is turned off, according to claim 2, wherein the light control switch is a double pole switch, one pole of which is electrically connected to control operation of the headlights and the other pole of which is electrically connected to control operation of the tail/park lights, wherein the auxiliary switch means is a two pole switch with one pole for electrical connection in series with one pole of the light control switch and the vehicle headlights and the other pole for electrical connection in series with the other pole of the light control switch and the vehicle tail/park lights.

4. Apparatus for turning out the headlights of a vehicle when the ignition switch of the vehicle is turned off, according to claim 3, wherein the bypass switch means is a two pole switch with one pole for electrical connection in parallel with the pole of the auxiliary switch means which is connected to the headlights and the other pole for electrical connection in parallel with the pole of the auxiliary switch means which is connected to the tail/park lights.

5. Apparatus for turning out the headlights of a vehicle when the ignition switch of the vehicle is turned off, according to claim 4, wherein the one pole of the bypass switch means is to be connected in parallel with both the one pole of the auxiliary switch means and the one pole of the light control switch connected to the vehicle headlights, and the other pole of the bypass switch means is to be connected in parallel with both the other pole of the auxiliary switch means and the other pole of the light control switch connected to the vehicle tail/park lights.

6. Apparatus for turning out the headlights of a vehicle when the ignition switch of the vehicle is turned off according to claim 5, wherein the bypass circuitry is also adapted to be coupled to a vehicle windshield wiper switch to cause operation of the bypass switch means and operation of the vehicle headlights and tail/park lights when the windshield wiper switch is turned on and the ignition switch is on, but the light control switch is turned off.

7. Apparatus for turning out the headlights of a vehicle when the ignition switch of the vehicle is turned off, according to claim 6, wherein the bypass circuitry includes means for maintaining the bypass switch means closed after the bypass switch means has been closed by reason of operation of the windshield wiper switch until the ignition switch is turned off.

8. Apparatus for turning out the headlights of a vehicle when the ignition switch of the vehicle is turned off, according to claim 7, wherein the means for maintaining the bypass switch means dosed includes a silicon control rectifier.

9. Apparatus for turning out the headlights of a vehicle when the ignition switch of the vehicle is turned off, according to claim 8, wherein the bypass switch means is a double pole relay having a relay coil and current to the relay coil is controlled by the silicon control rectifier.

10. Apparatus for turning out the headlights of a vehicle when the ignition switch of the vehicle is turned off, according to claim 9, wherein the auxiliary switch means is a double pole relay.

11. Apparatus for turning out the headlights of a vehicle when the ignition switch of the vehicle is turned off, according to claim 1, wherein the auxiliary switch means is a relay.

12. Apparatus for turning out the headlights of a vehicle when the ignition switch of the vehicle is turned off, according to claim 1, wherein the bypass switch means is a relay.

13. Apparatus for turning out the headlights of a vehicle when the ignition switch of the vehicle is turned off and for turning on the headlights of a vehicle when the vehicle windshield wiper switch is turned on, said vehicle having a light control switch electrically connected to the headlights to control operation of the headlights, comprising:

auxiliary switch means for electrical connection in series with a vehicle light control switch and vehicle headlights so that both the light control switch and auxiliary switch must be closed to operate the headlights;

bypass switch means for electrical connection in parallel with said auxiliary switch means and light control switch;

control circuitry to be coupled to the ignition switch to allow closing of the auxiliary switch means and operation of the headlights when the ignition switch is on, but to open the auxiliary switch means and prevent operation of the headlights when the ignition switch is off; and bypass circuitry to be coupled to the ignition switch and vehicle windshield wiper switch for operating the bypass switch means to cause closure of the bypass switch means and operation of the headlights when both the ignition switch and the windshield wiper switch are on but the light control switch is off, and to open the bypass switch means and prevent operation of the headlights when the ignition switch is off.

14. Apparatus for turning out the headlights of a vehicle when the ignition switch of the vehicle is turned off, according to claim 13, wherein the bypass circuitry includes means for maintaining the bypass switch means closed after the bypass switch means has been closed by reason of operation of the windshield wiper switch until the ignition switch is turned off.

15. Apparatus for turning out the headlights of a vehicle when the ignition switch of the vehicle is turned off, according to claim 14, wherein the means for maintaining the bypass switch means closed includes a silicon control rectifier.

16. Apparatus for turning out the headlights of a vehicle when the ignition switch of the vehicle is turned off, according to claim 15, wherein the bypass switch means is a double pole relay having a relay coil and current to the relay coil is controlled by the silicon control rectifier.

17. Apparatus for turning out the headlights of a vehicle when the ignition switch of the vehicle is turned off, according to claim 13, wherein the light control switch is also electrically connected to and controls operation of the vehicle tail/park lights in addition to the vehicle headlights, and both the auxiliary switch means and the bypass switch means are also electrically connected to the tail/park lights similarly to the headlights to allow operation of the tail/park lights when the ignition switch in on but to turn out the tail/park lights when the ignition switch of the vehicle is turned off.

* * * * *